United States Patent
Geiger

(10) Patent No.: US 6,718,597 B2
(45) Date of Patent: *Apr. 13, 2004

(54) ROTATABLE DUAL SPACING CLAMP TIE

(75) Inventor: Gerard G. Geiger, Jackson, WI (US)

(73) Assignee: HellermannTyton Corporation, Milwaukee, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/066,386

(22) Filed: Feb. 1, 2002

(65) Prior Publication Data

US 2002/0104196 A1 Aug. 8, 2002

Related U.S. Application Data

(60) Provisional application No. 60/266,144, filed on Feb. 2, 2001.

(51) Int. Cl.⁷ .............................................. B65D 63/10
(52) U.S. Cl. ................... 24/16 PB; 248/74.3
(58) Field of Search .............................. 403/52, 65, 78, 403/79; 248/68.1, 74.3; 24/16 R, 16 PB, 30.5 P, 341, DIG. 41

(56) References Cited

U.S. PATENT DOCUMENTS

| | | | |
|---|---|---|---|
| 2,945,713 A | * 7/1960 | Sears ........................... 403/73 |
| 3,250,505 A | 5/1966 | Rodman, Sr. et al. |
| 3,461,510 A | * 8/1969 | Holmes ..................... 24/16 PB |
| 3,486,725 A | 12/1969 | Hidassy |
| 3,632,070 A | 1/1972 | Thayer et al. |
| 3,739,429 A | * 6/1973 | Kohke ....................... 24/16 PB |
| 3,913,876 A | 10/1975 | McSherry |
| 4,128,220 A | * 12/1978 | McNeel ........................ 248/60 |
| 4,272,047 A | * 6/1981 | Botka ........................ 248/74.3 |
| 4,768,741 A | 9/1988 | Logsdon |
| 4,817,897 A | * 4/1989 | Kreusel ..................... 248/68.1 |
| 4,925,136 A | 5/1990 | Knott |
| 5,332,179 A | 7/1994 | Kuffel et al. |
| 5,337,983 A | 8/1994 | Mailey |
| 5,386,615 A | 2/1995 | Bernard |
| 5,402,971 A | * 4/1995 | Bower ........................ 248/74.3 |
| 5,538,208 A | * 7/1996 | Cordes et al. ................. 248/69 |
| 5,653,409 A | 8/1997 | White, Jr. et al. |
| 5,730,399 A | 3/1998 | Baginski |
| 5,820,048 A | 10/1998 | Shereyk et al. |
| 5,862,927 A | * 1/1999 | Tebeau ...................... 215/11.1 |
| 5,884,367 A | 3/1999 | Teagno et al. |
| 5,996,781 A | 10/1999 | Geiger |
| 6,196,751 B1 | 3/2001 | Shereyk et al. |
| 6,240,602 B1 | * 6/2001 | Geiger ..................... 24/16 PB |

FOREIGN PATENT DOCUMENTS

GB 2129863 5/1984

* cited by examiner

*Primary Examiner*—James R. Brittain
(74) *Attorney, Agent, or Firm*—Ryan Kromholz & Manion, S.C.

(57) ABSTRACT

A dual spacing clamp tie includes a rotatable locking head and two flexible straps extending outwardly in opposite directions from the locking head. The straps are insertable through the locking head to form two, spaced loops that can be used to secure items in spaced, parallel relationship to each other. A pair of releasable pawls in the locking head secures the straps around the items to be secured. An aperture may be provided through the locking head or adjacent the locking head for securing the dual spacing clamp tie to a mounting structure such as a threaded stud. An additional pawl mechanism may be provided within the aperture to secure the clamp tie to the mounting stud. Alternatively, a nut or other fastener may be used to secure the clamp tie to the mounting stud.

20 Claims, 16 Drawing Sheets

ROTATABLE DUAL SPACING CLAMP TIE

RELATED APPLICATION

This application claims the benefit of co-pending Provisional Application Serial No. 60/266,144, filed Feb. 2, 2001.

BACKGROUND OF THE INVENTION

This invention relates generally to specialized devices for securing elongate items, such as wires, cables, hoses, tubing, or conduits. More particularly, the invention relates to clamp ties that secure elongate items in spaced, rotatable relationship to one another.

Various devices have been developed for securing elongate items such as wires, cables, hoses, etc. Among these devices are clamps that secure a pair of such items in spaced, parallel relationship with each other. Examples of such a clamp is shown in U.S. Pat. No. 5,966,781, assigned to the same assignee as the present invention. Although effective in securing elongate items to each other, the device shown in the '781 patent makes no provision for securing the items in a non-parallel relationship. A clamp that contemplates this possibility can be found in U.S. Pat. No. 6,240,602, also assigned to the same assignee as the present invention. The '602 patent discloses a dual spacing clamp tie that secures items in parallel or non-parallel relationship. However, the means for pivotally attaching adjacent members to one another was disclosed as a ball and socket arrangement, whereas the present invention provides pivotally supported means in the form of a radially extending pin and flange members. This arrangement permits additional surface engagement for the rotatable members adding to their strength, and in particular when attached to a stationary supporting structure. Further, a co-pending application Ser. No. 09/952,324 filed on Sep. 14, 2001 entitled Dual Swivel Saddle Spacer and assigned to the same assignee as the present invention discloses a pivotal supporting disk for adjacent support members and adapted to receive independent conventional cable ties and not, as disclosed in the present application, integrally formed cable ties.

SUMMARY OF THE INVENTION

The invention provides a dual spacing clamp tie having a bifurcated locking head, a pair of straps extending in opposite directions from the locking head, a first pawl mechanism within the locking head for engaging and retaining one of the straps, and a second pawl mechanism within the locking head for engaging and retaining the other of the straps.

In the various embodiments, each portion of the bifurcated locking head is provided with means for pivotally receiving and attaching the dual spacing clamp tie to each other. In a first embodiment, the bifurcated head is provided with a flange portion and centrally located re-entrant bore having an interior configuration adapted to receive and rotatably engage a flange portion and pivot pin of the other head member. The strap portions of the dual spacing clamp tie are arranged to circumscribe and support the object to be secured. The bifurcated locking head may include at least one mounting boss for securing the dual spacing clamp tie to a support structure.

In a second embodiment, a disc member may be interposed between the two elements of the bifurcated locking head. The disc member includes a centrally located pivot pin and a primary, radially extending, flange portion. The pivot pin further includes a distal end having a secondary flange portion. The bifurcated locking head is adapted to pivotally receive and attach to the pivot pin and secondary flange portion of the disc member. In another embodiment, the assembly includes a bifurcated locking head and a double pinned disc interposed between the two locking head members.

In yet another embodiment, the bifurcated locking head is comprised of two identical halves that rotatably interlock to form the clamp tie. Each locking head half includes a clip portion, a pin portion and a pawl mechanism for engaging and retaining one of its integrally formed straps. When assembled, the clip portion of the first half engages with the pin portion of the second half while the clip portion of the second half engages with the pin portion of the first half.

In a further embodiment, the bifurcated locking head is comprised of a first head half that includes an integrally formed pin within a flange portion. The second head half that includes a flange portion and a clip for receiving the pin. Each head half further includes a pawl mechanism for engaging and retaining one of its integrally formed elongated straps. Once assembled, the bifurcated head of the clamp tie is capable of three hundred sixty degrees of rotation.

It is an object of the present invention to provide a rotatable dual spacing clamp tie that is convenient and economical in manufacture.

It is a further object of the present invention to provide a rotatable dual spacing clamp tie to provide spaced-apart, rotatable support of bundled articles.

It is a further object of the invention to provide a rotatable dual spacing clamp tie that reliably and effectively secures items such as wires, cables or hoses into bundles in pivotal relationship.

It is a further object of the present invention to provide a rotatable dual spacing clamp tie that may be secured to a support structure.

DETAILED DESCRIPTION

Although the disclosure hereof is detailed and exact to enable those skilled in the art to practice the invention, the physical embodiments herein disclosed merely exemplify the invention that may be embodied in other specific structure. While the preferred embodiment has been described, the details may be changed without departing from the invention, which is defined by the claims.

Rotatable dual spacing clamp ties 10 embodying the various features of the invention are shown in FIGS. 1, 1a, 5, 16 and 25. As best seen in FIG. 2, the rotatable dual spacing clamp tie 10 functions to hold two elongate items 11 and 12 (seen in phantom), in spaced, rotatable relationship with each other. In the example shown, the items 11 and 12 are bundled cables. It will be appreciated, however, that the particular items secured by the rotatable dual spacing clamp tie 10 are not critical and can comprise wires, hoses, cables, tubes, conduits, fiber optics, vines or other such items as well as bundles made up of multiple ones of such items.

Figure 1:
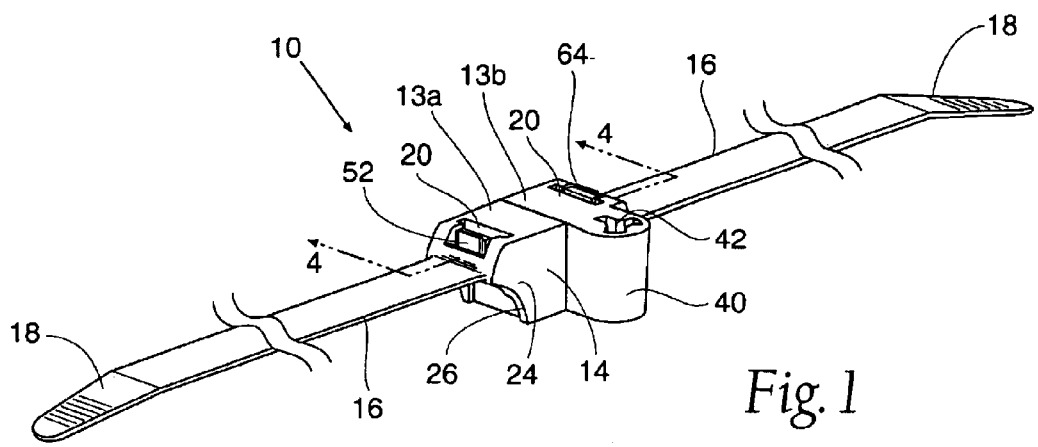
FIG. 1 is a perspective view of a rotatable dual spacing clamp tie with mount embodying various features of the invention.
Figure 2:
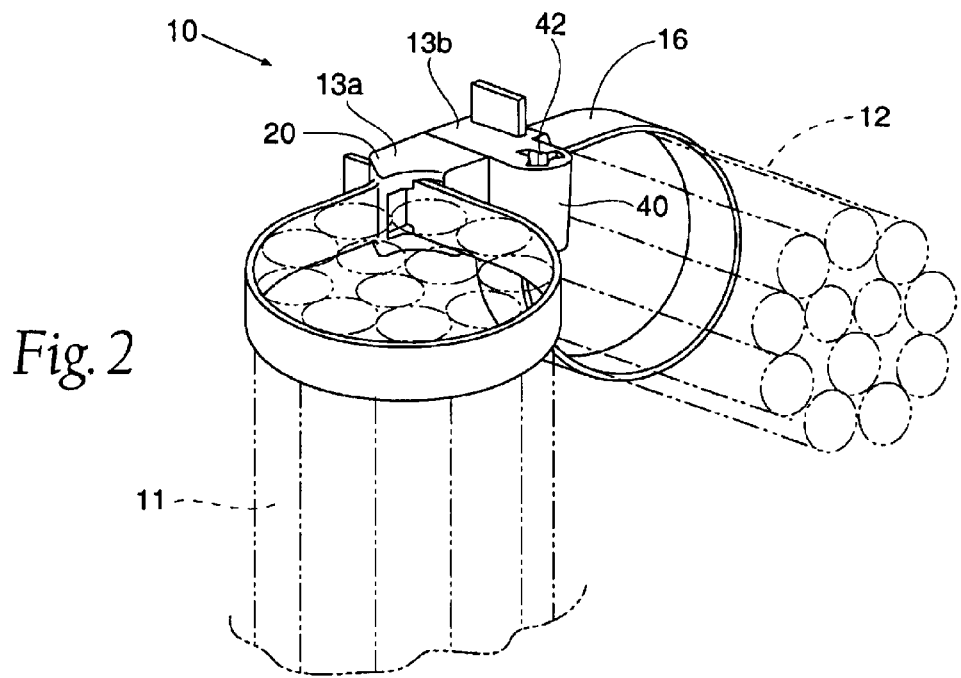
FIG. 2 is a perspective view of a rotatable dual spacing clamp tie with the mount installed on a pair of bundles, shown in phantom.

Prior to use, the rotatable dual spacing clamp tie 10 appears as shown, for example, in FIG. 1. As illustrated, the rotatable dual spacing clamp tie 10 includes a bifurcated locking head 14 preferably centrally disposed between a pair of elongate straps 16 that extend outwardly in opposite directions from the bifurcated locking head 14. The bifurcated locking head 14 may be further distinguished as having two rotationally relative members 13a, 13b.

The straps 16 are each preferably of substantially uniform width and thickness except at their ends where each tapers into a tie tail portion 18. A slot 20 is formed through each of the locking head 14 members 13a, 13b. Each slot 20 is shaped and dimensioned to allow the passage of the adjacent strap 16 therethrough. The items 11 and 12 to be secured by the rotatable dual spacing clamp tie 10 are secured by looping one of the straps 16 around the items 11 and 12 and inserting the tail portion 18 of the strap 16 through an adjacent slot 20 in a locking head 14 member 13a, 13b. The straps are then pulled to tighten them around the items 11 and 12. The tapered tie tail 18 of each strap 16 facilitates insertion of the strap through the adjacent slot 20.

Figure 3:
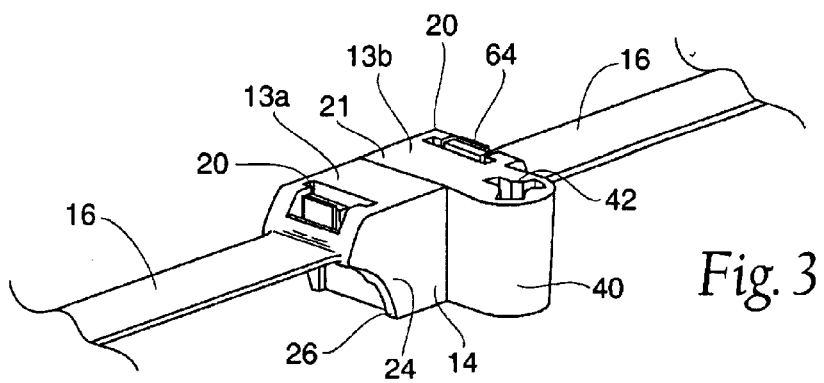
FIG. 3 is a fragmentary perspective view of the rotatable dual spacing clamp tie with the mount showing the bifurcated locking head members in relative alignment.
Figure 3A:
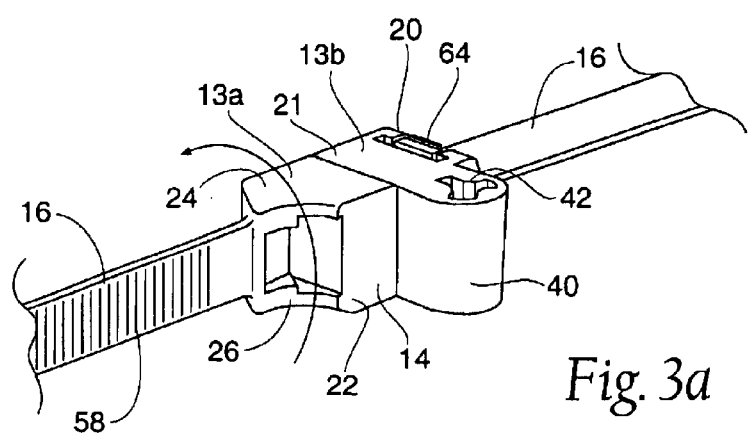
FIG. 3a is a fragmentary perspective view of the rotatable dual spacing clamp tie with the mount showing rotational movement and with the bifurcated locking heads positioned in angularly relative alignment with respect to one another.
Figure 4:
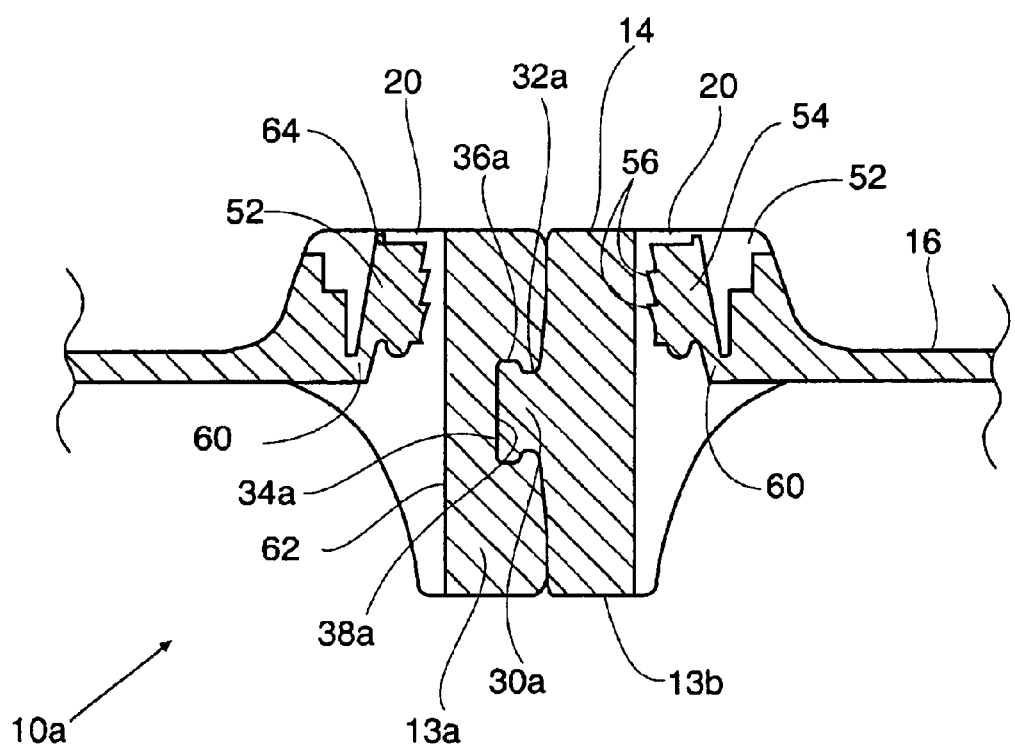
FIG. 4 is a longitudinal section view of the rotatable dual spacing clamp tie and taken along lines 4—4 of FIG. 1.
Figure 7:
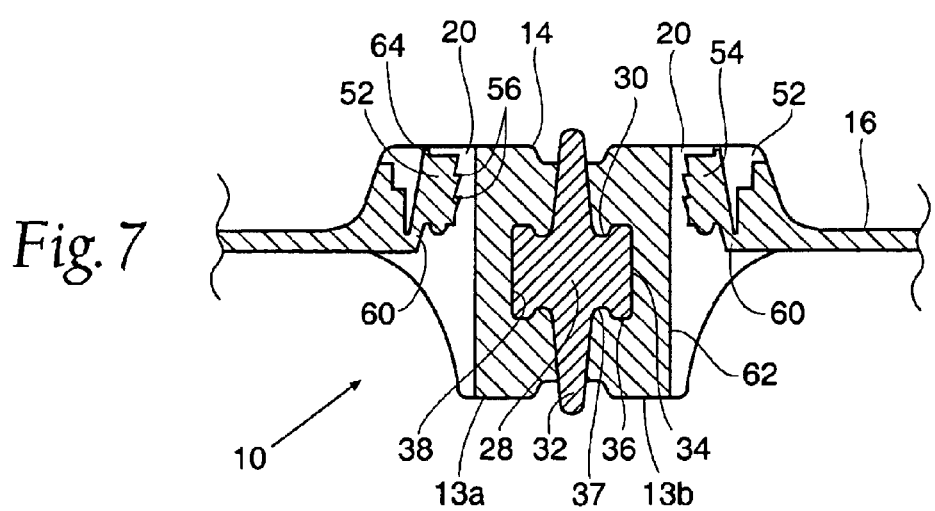
FIG. 7 is longitudinal section view of the rotatable dual spacing clamp tie and taken along lines 7—7 of FIG. 6.
Figure 8:
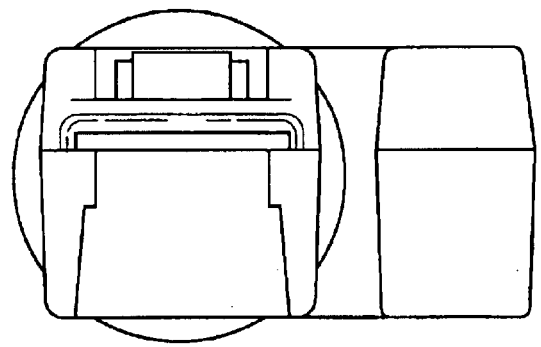
FIG. 8 is a right side elevational view of the rotatable dual spacing clamp tie of FIG. 5.

In accordance with one aspect of the invention, and as shown, for example in FIGS. 1, 4 and 7, a pawl mechanism 52 is provided in each slot 20 of locking members 13a, 13b for securing the straps 16 within the slots 20 and around the items 12 to be secured. As illustrated, particularly with respect to FIGS. 4 and 7, each of the pawl mechanisms 52 includes a pawl 54 having a generally wedge or cammed shaped cross section. A forward surface of each pawl 54 is provided with a plurality of teeth 56 that engage complementary serrations 58 (seen in FIG. 3a) formed on the facing side of each strap 16 when the strap 16 is looped around the bundles 11 or 12 to be secured and the tie tail portion 18 is inserted through a respective slot 20.

As best seen in FIGS. 4 and 7, each pawl 54 is carried at the end of an integrally formed hinge 60 that enables the pawl 54 to pivot relative to the bifurcated locking head 14. Preferably, the pawls 54 are biased toward the strap 16 to pinch the strap 16 between the pawl 54 and the interior sidewall 62 of each slot 20 when the strap 16 is inserted through the slot 20 in each head member 13a, 13b. This arrangement helps ensure intimate contact between the serrations 58 on the straps 16 and the teeth 56 of the pawls 54. Preferably, the teeth 56 of the pawls 54 and the serrations 58 on the strap 16 are ramped as shown.

The ramped surfaces of the teeth 56 and the serrations 58 are formed to push the pawl 54 away from the strap 16 as the strap 16 is inserted through the slot 20. Withdrawing movement of the strap 16 relative to the slot 20, however, pulls the pawl 54 into stronger engagement with the serrations 58 of the strap 16 to resist such withdrawing movement and thereby secures the strap 16 within the slot 20 and around the bundles 11 and 12 to be secured.

Preferably, each of the pawl mechanisms 52 is releasable. To this end, a finger tab 64 is integrally formed on each pawl 54 and is accessible from the top of a respective one of each bifurcated head member 13a, 13b. By pulling the finger tab 64 away from the strap 16 with a fingernail, screwdriver or other device (not shown), the pawl 54 is pulled away from engagement with the strap 16. This releases the strap 16 thereby enabling the strap 16 to be withdrawn from a respective bifurcated head member 13a, 13b to free the secured bundles 12. In this manner, the rotatable dual spacing clamp tie 10 can be released and the secured bundles 12 released and removed.

Referring further to FIGS. 1–8, each locking head member 13a, 13b includes an upper surface 21, a lower surface 22 (see FIG. 3a), a pair of substantially parallel, planar side surfaces 24, and an arcuate engaging surface 26 positioned and shaped to lie closely adjacent the items 12 when they are secured by the rotatable dual spacing clamp tie 10. In the illustrated embodiment, each engaging surface 26 is positioned adjacent and below the juncture of a strap 16 with a respective locking head member 13a, 13b. Each engaging surface 26 generally conforms to the circular shape of the loop that is formed when a respective strap 16 is inserted through a slot 20 and pulled tight against the items 12 to be secured. It will be apparent that the final diameter of the loop formed by each strap 16 depends on the size of the items 11 or 12 to be secured. If desired, each engaging surface 26 can be shaped to match the anticipated size of the item 12 or 13 to be secured.

As viewed in FIGS. 1–4, a first embodiment of the rotatable dual spacing clamp tie 10a is shown. As shown particularly in FIG. 4, one locking head member, 13b, is provided with an integrally formed pivot pin 30a, while the second locking head member 13a is provided with a re-entrant bore 38a. The pivot pin 30a further includes a distal end portion 34a having a head portion 36a and an undercut collar 32a. The re-entrant bore 38a has an interior configuration adapted to receive and rotatably engage the flange portion 36a of the pivot pin 30a.

Now referring to FIGS. 5–8, a second embodiment of the rotatable dual spacing clamp tie 10 further includes an separately formed disc member 28 comprising a centrally located pivot pin 30 and a primary, radially extending, flange portion 32. The pivot portion 30 further includes a distal head portion 34 having a secondary flange portion 36 and an undercut collar 37. Each locking head member 13a, 13b is adapted to pivotally receive and attach to the pivot pin 30 of disc member 28. Each locking head member 13a, 13b is provided with a centrally located re-entrant bore 38 having an interior configuration adapted to receive and rotatably engage the head 34 of the pivot pin 30 and its secondary flange portion 36. While the re-entrant bore is shown centrally located, it is to be understood that it could be located anywhere along the members 13a and 13b.

Figure 1A:
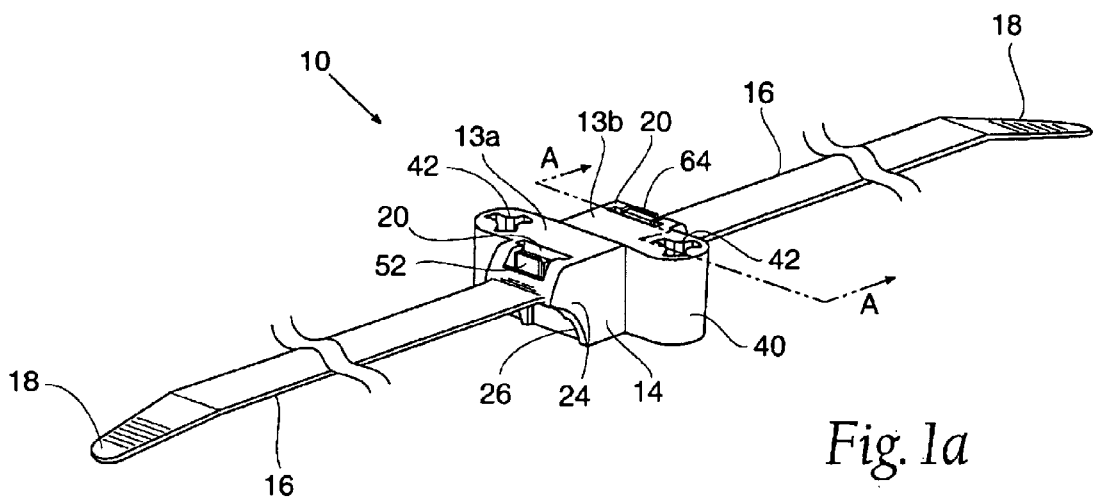
FIG. 1a is a perspective view of a rotatable dual spacing clamp tie with two mounts and embodying various features of the invention.
Figure 5:
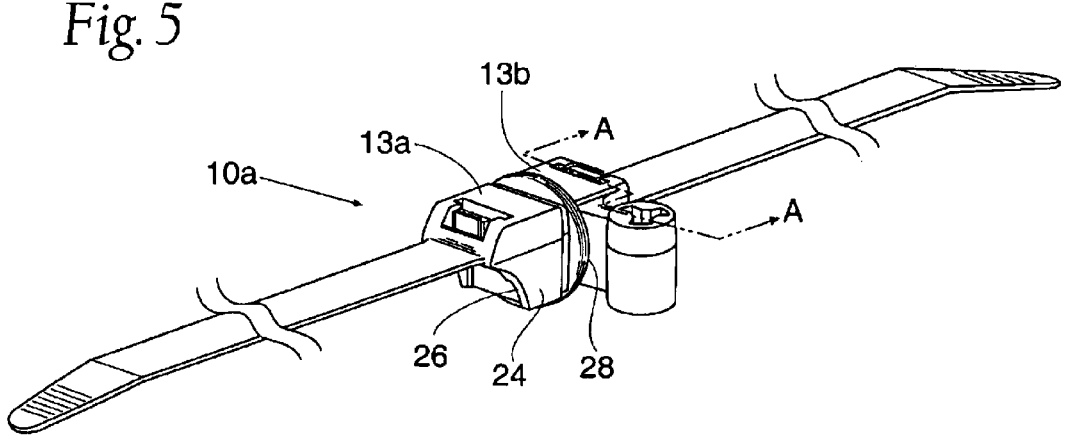
FIG. 5 is a perspective view of an alternate rotatable dual spacing clamp tie with mount embodying various features of the invention.

In addition to securing items 11 and 12 to each other in rotatably spaced relation, the rotatable dual spacing clamp tie 10 and 10a may also function to secure the items 11 and 12 to another structure such as a stationary support element. To this end, and as seen in FIGS. 1, 1a and 5, the bifurcated locking head 14 may be integrally molded with at least one mounting boss 40 having an aperture 42 formed therein. Mounting boss 40 permits a mounting element, such as a threaded mounting stud 9, to extend through the aperture 42 formed in the mounting boss 40.

Figure 6:
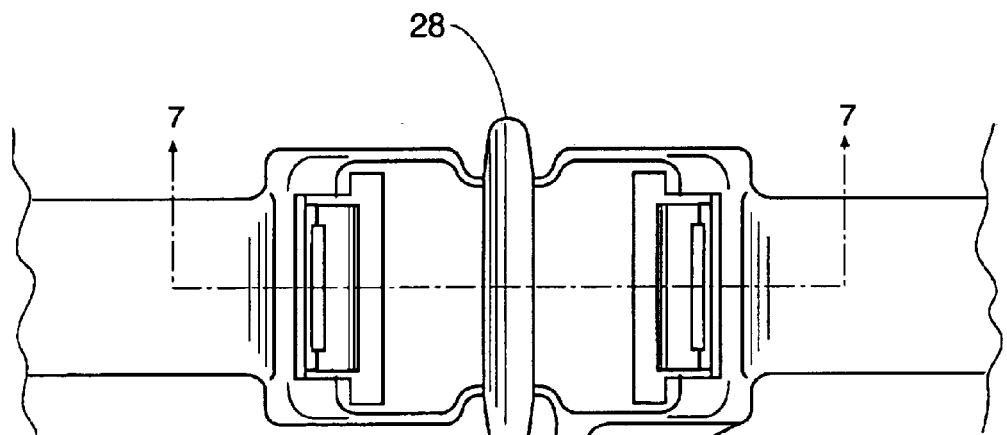
FIG. 6 is a fragmentary top plan view of the bifurcated locking head and mounting boss similar to that shown in FIG. 5.

As illustrated generally in FIG. 6, and similarly to the pawls 54 in slots 20, one or more pawls 44 are carried at the end of an integrally formed hinge 48 that enables each pawl 44 to pivot relative to the wall 50 of the aperture 42. Each pawl 44 is biased toward the center of the aperture 42 to secure a mounting stud within the aperture 42 when the mounting stud is inserted through the aperture 42. Each pawl may include one or more teeth 46 to ensure intimate contact between the teeth 46 of the pawl 44 and the threads of the mounting stud. Some of the pawl embodiments are bi-directional meaning that either end of the mounting boss 40 can be inserted onto the stud. Other pawl embodiments are unidirectional. By way of example only, and not intending to be limiting, exemplary pawl designs are described below.

As illustrated in FIGS. 9–12, further embodiments of the present invention 10 and 10a include modifications of the pawl mechanisms residing in the aperture 42 of the mounting boss 40. In each case, the outer configuration of the mounting boss 40 is similar. In the embodiments illustrated in FIGS. 9–12, the mounting stud 9 is welded to an underlying support or structure 8 such as, for example, a support bracket. In the views of FIGS. 9–12, the aperture 42 is seen to include at least one pawl mechanism 44 for securing a mounting element 9 within the mounting boss 40.

Figure 9:
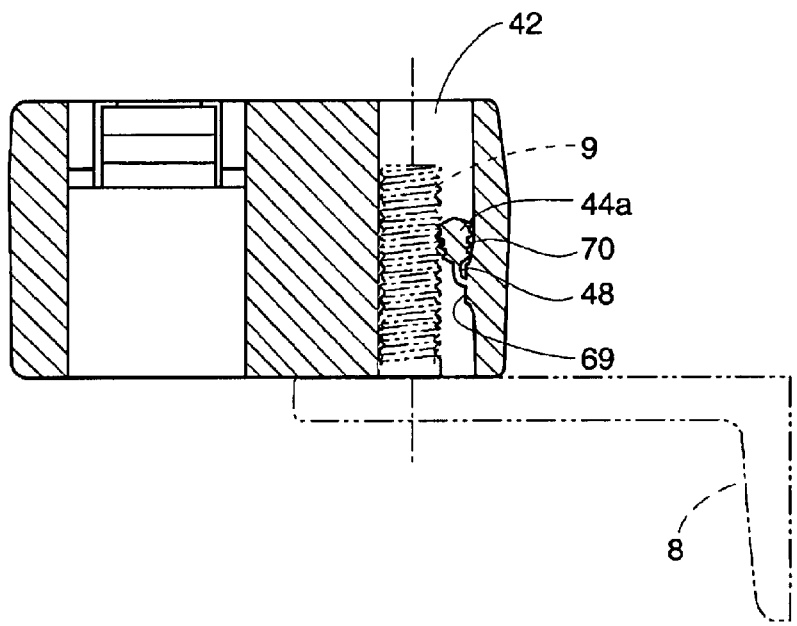
FIG. 9 is an longitudinal section view of a mounting element and one bifurcated head member and taken along lines A—A of FIG. 1a or 6, and showing a bi-directional pawl member having a series of longitudinally stepped teeth with mounting element and support element shown in phantom.

A first alternate embodiment mounting boss with pawl mechanism is illustrated in FIG. 9. It will be apparent that the alternate embodiment pawl 44a protrudes from a shoulder 69 formed in the aperture 42 of mounting boss 40. The pawl 44a is configured to provide a series of stepped teeth 70 which are longitudinally spaced to engage with a series of threads on the mounting element 9. It will be noted that the alternate embodiment pawl 44a seen in FIG. 9 includes a hinge 48 of sufficient flexibility and length to permit the pawl 44a to fold upwardly and against the shoulder 69 thereby tightly engaging the threaded mounting element 9 and providing a secure engaged fit. The engaged fit between the pawl 44a and mounting element 9 resists withdrawing movement. It should also be noted that the orientation of the pawl 44a permits passage of the mounting element 9 in either direction through the aperture 42 and thereafter resists withdrawing movement of the mounting element 9 in the opposite direction through aperture 42. This enables the mounting boss 40 to be pressed onto the mounting element 9 from either side with relatively little effort. The symmetrical structure of the pawl 44a allows the mounting boss 40 to be retained onto the mounting element 9 regardless of the mounting boss orientation. In other words, when use with pawl 44a, the mounting boss 40 is bi-directional with respect to the mounting element 9.

Figure 10:
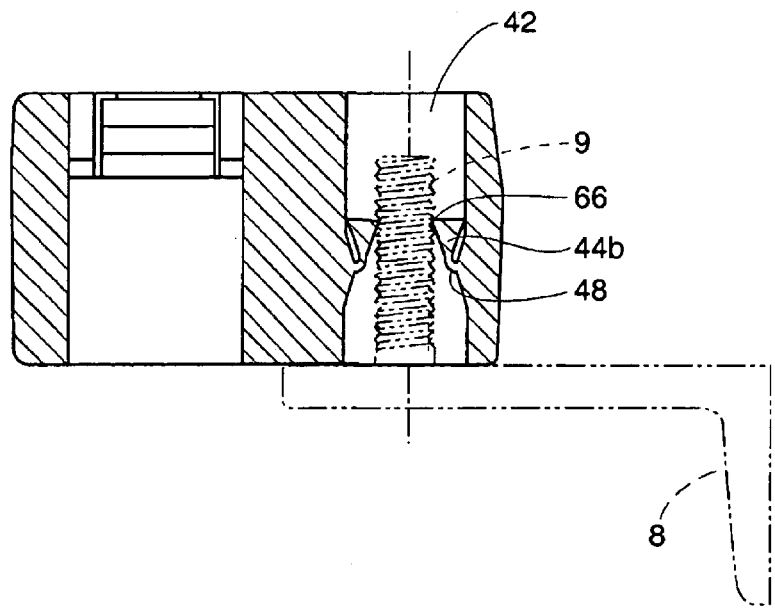
FIG. 10 is an alternate longitudinal section view of a mounting element and one bifurcated head member and taken along lines A—A of FIG. 1a or 6, and showing alternate embodiment, bi-directional pawl members engagable with the root of a thread with mounting element and support element shown in phantom.

Another alternate embodiment of the mounting boss 40 is shown particularly in FIG. 10. In this embodiment, the pawl mechanism 44b comprises a pair of substantially triangularly shaped members carried at the end of an elongate hinge 48. As seen in this view, passage of the mounting element 9 through the aperture 42 deflects the pawls 44b as shown. The pawls pivot around their respective hinges 48 so that the outer most points 66 of the pawls 44b engage the mounting element 9 thereby causing a wedge lock condition between the aperture 42 and pawl 44b. If the mounting element 9 is threaded as shown, the points 66 engage the threads to help secure and retain the dual spacing rotatable clamp tie 10 to the mounting element 9. Withdrawing motion of the mounting element 9 thereafter tends to wedge the pawls 44b between the walls 50 of the aperture 42 to further lock the dual spacing rotatable clamp tie 10 to the mounting element 9.

Figure 11:
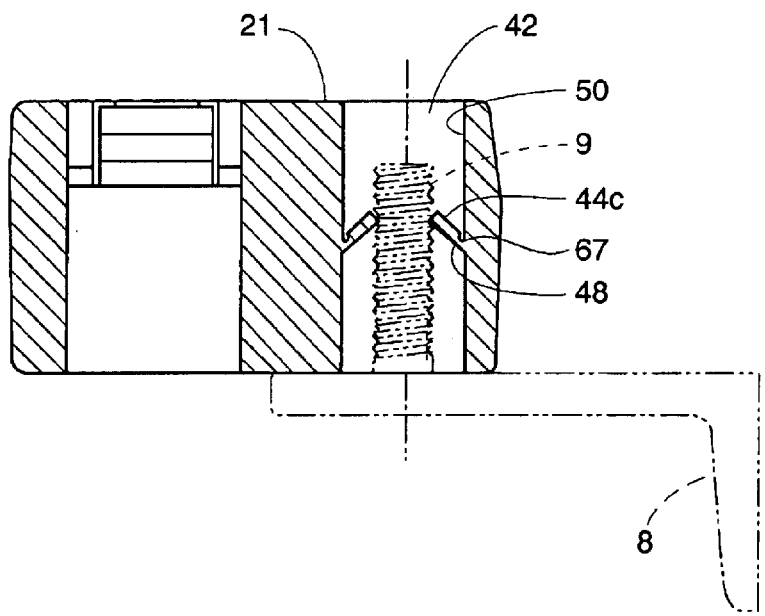
FIG. 11 is an alternate longitudinal section view of a mounting element and one bifurcated head member and taken along lines A—A of FIG. 1a or 6, and showing alternate embodiment pawl members engagable with the root of a thread with mounting element and support element shown in phantom.

Another alternate embodiment mounting boss with pawl mechanism is seen in FIG. 11. In this embodiment, angled pawls 44c project inwardly into the aperture 42. As illustrated, the pawls 44c are substantially straight and each include a hinge portion 48 formed by a transverse groove 67 or reduced thickness area adjacent the juncture of each pawl 44c with the wall 50. Although not specifically illustrated, it is within the province of the invention to provide any number of pawls 44c projecting inwardly into aperture 42. As seen in FIG. 11, the pawls 44c are angled upwardly toward the upper surface 21 of a bifurcated locking head member 13b and are thus orientated obliquely relative to the central axis of the mounting boss 40. Accordingly, when the mounting boss 40 is pressed downwardly into the mounting element 9 with the locking head upper surface 21 upper most, the pawls 44c deflect away from the element 9 to permit passage of the element 9 through the aperture 42 of the mounting boss 40. Thereafter, the distal ends of the pawls 44c engage the threads of the element 9 to resist withdrawing movement of the element 9 relative the dual spacing rotatable clamp tie 10 or 10a.

Figure 12:
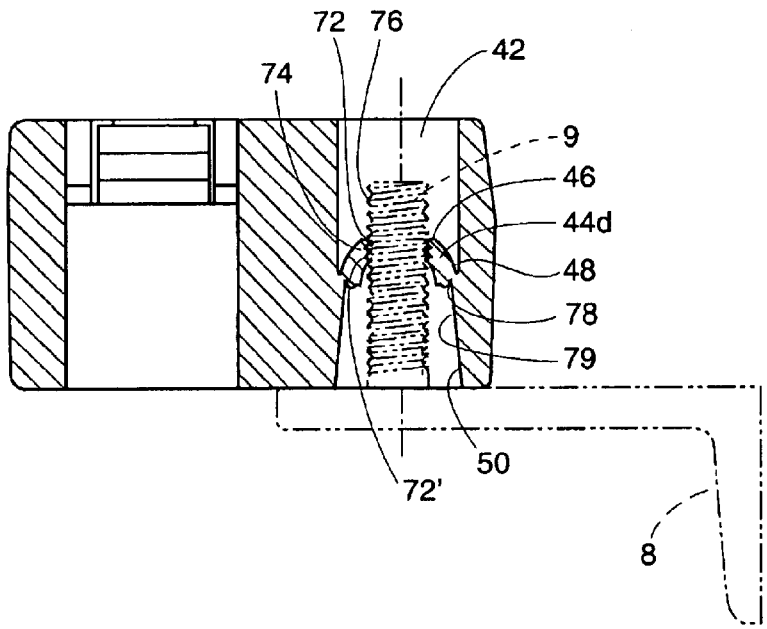
FIG. 12 is an alternate longitudinal section view of a mounting element and one bifurcated head member and taken along lines A—A of FIG. 1a or 6, and showing alternate embodiment, bi-directional pawl members engagable with the crest and root of a thread with mounting element and support element shown in phantom.

Another alternate embodiment of the mounting boss with pawl mechanism is shown in the view of FIG. 12. It will be apparent in this embodiment that a pair of pawls 44d protrude from the inner wall 50 of the aperture 42. It will be noted that each pawl 44d includes a hinge portion 48 integrally molded with the wall 50 of aperture 42. Each pawl 44d has spaced teeth 72 and 72' that define an intermediate root 74 (i.e. the root 74 is formed between the spaced teeth 72 and 72'). The root 74 engages with the crest 76 of a thread on the stud 9. The geometry of teeth 72 and 72' and the hinge 48 allow them to ride over the threaded stud 9 as the mounting boss 40 is inserted over stud 9 as shown. When the direction of the mounting boss 40 is reversed, at least one of the teeth 72 and 72' is engaged with the threaded mounting boss 40 and the pawl 44d is bent downwardly. As seen in FIG. 9, when a sufficient force is exerted upon the mounting boss 40 the hinge portion 48 collapses and the lobe portion 78 exerts a force or is pushed against the wedge ramp 79. In this wedged condition, the mounting boss 40 cannot be removed from the mounting stud 9. This feature aids in the ultimate securement of the inter-fitting elements as this engagement resists withdrawing movement of the mounting boss 40 and dual spacing rotatable clamp tie 10.

Figure 13:
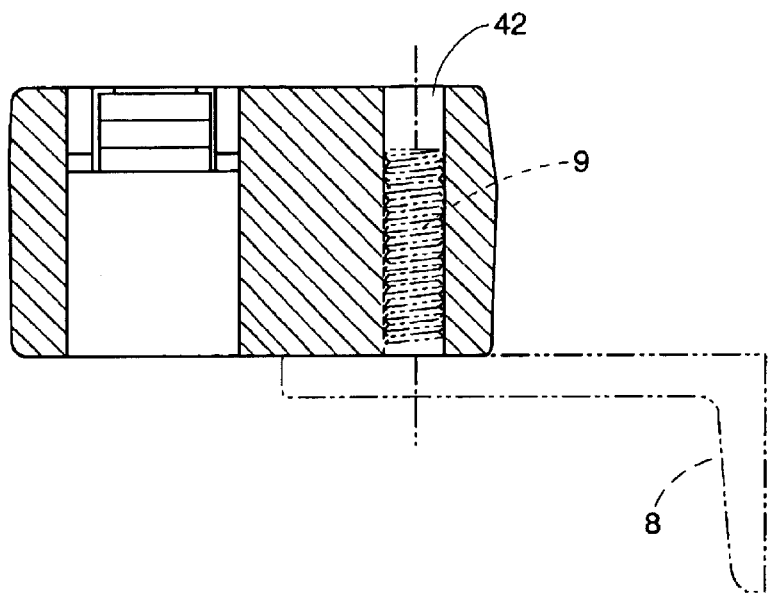
FIG. 13 is an alternate longitudinal section view of a mounting element and one bifurcated head member and taken along lines A—A of FIG. 1a or 6, and showing an alternate embodiment wherein the aperture provides an interference fit for the mounting element, seen in phantom.

In the alternate embodiment mounting boss shown in FIG. 13, the diameter of the aperture 42 is slightly undersized relative to the diameter of the mounting element 9 so that a friction fit (i.e. interference fit) or engagement results when the mounting boss 40 is pressed onto the mounting element 9. As an example, making the diameter of the aperture 42 approximately five percent smaller than the diameter of the mounting element 9 has been found to give satisfactory results. Friction between the side walls 50 of the aperture 42 and the mounting element 9 is sufficient to keep the dual spacing rotatable clamp tie 10 and mounting boss 40 on the mounting element 9.

Figure 14:
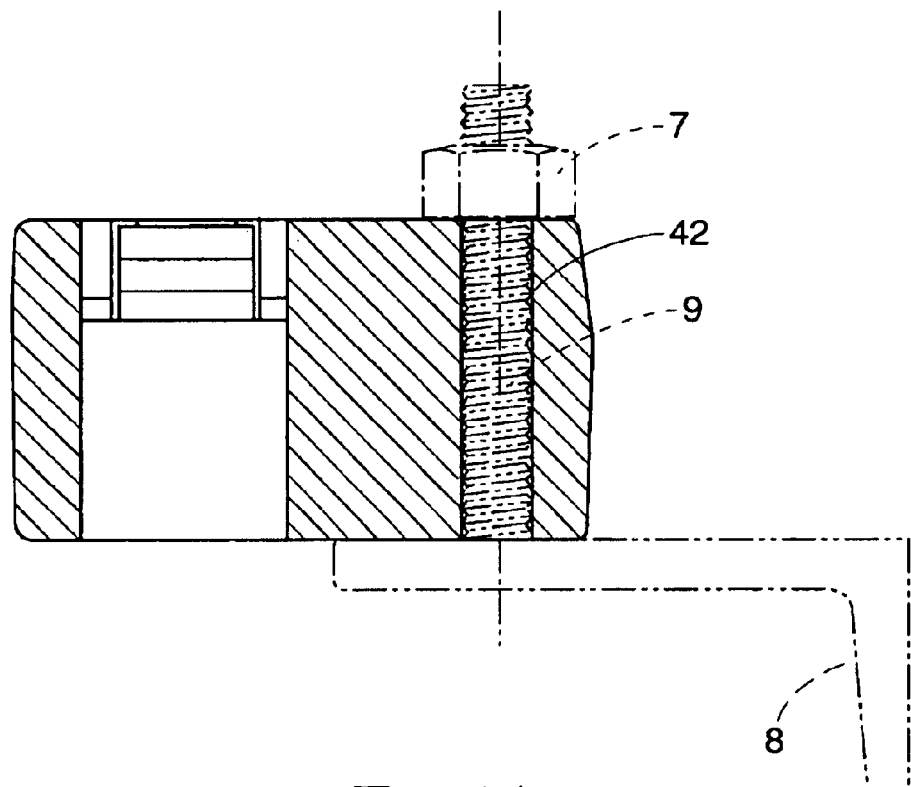
FIG. 14 is an alternate longitudinal section view of a mounting element and one bifurcated head member and taken along lines A—A of FIG. 1a or 6, and showing an alternate embodiment wherein the aperture provides a clearance fit for the mounting element along with a nut for securing the mounting element, both seen in phantom.

As shown in FIG. 14, a nut 7 or other fastener device may be used to secure the clamp tie to the mounting stud.

Another alternate embodiment of the rotatable dual spacing clamp tie is shown in FIGS. 15–24. Each clamp tie 10b is formed from a pair of identical locking head members 14. Each head member 14 includes a top surface 21, a bottom surface 22, a pair of substantially parallel, planar side surfaces 24, and an arcuate engaging surface 26 positioned and shaped to lie closely adjacent the items 11 or 12 when they are secured by the rotatable dual spacing clamp tie 10b. Again in the illustrated embodiment, each engaging surface 26 is positioned adjacent and below the juncture of a strap 16 with a respective locking head member 14. Each engaging surface 26 generally conforms to the circular shape of the loop that is formed when a respective strap 16 is inserted through a slot 20 and pulled tight against the items 11 and 12 to be secured. It will be apparent that the final diameter of the loop formed by each strap 16 depends on the size of the items 11 or 12 to be secured. If desired, each engaging surface 26 can be shaped to match the anticipated size of the item 11 or 12 to be secured.

As viewed in FIGS. 15, and 22–24, each locking head member 14 is provided with an integrally formed pivot pin 30a and an integrally formed C-shaped snap 31. The pivot pin 30a extends between the flange portion 80 of the head member 14 and an upstanding support wall 82. The snap 31 includes a bearing surface 84 and a pair of beveled walls 86 forming an opening 88. The bearing surface 84 has a circumference greater than one hundred eight degrees thereby enabling the snap 31 to retain the pin 30a. Both the snap 31 and support wall 82 are integrally formed on support surface 21 that extends outwardly from the flange portion 80 of head member 14. The spacing between the snap 31 and support wall 82 is substantially equivalent to the spacing between the support wall 82 and flange 80 (or the length of the pin 30a). The width of the C-shaped snap 31 and support wall 82 is slightly less thereby allowing a clearance fit between these components when the clamp tie 10b is assembled.

Figure 15:
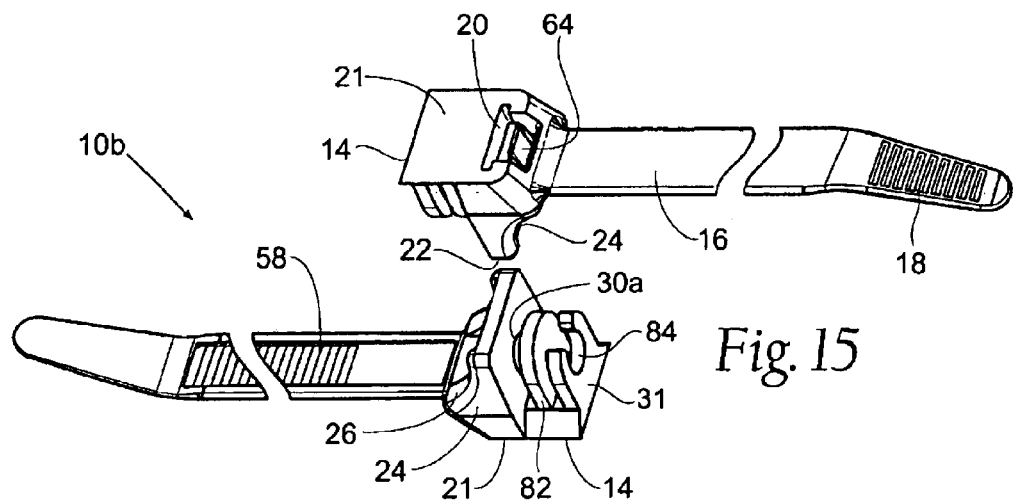
FIG. 15 is a perspective exploded view of a rotatable dual spacing tie clamp embodying the various features of the invention.
Figure 16:
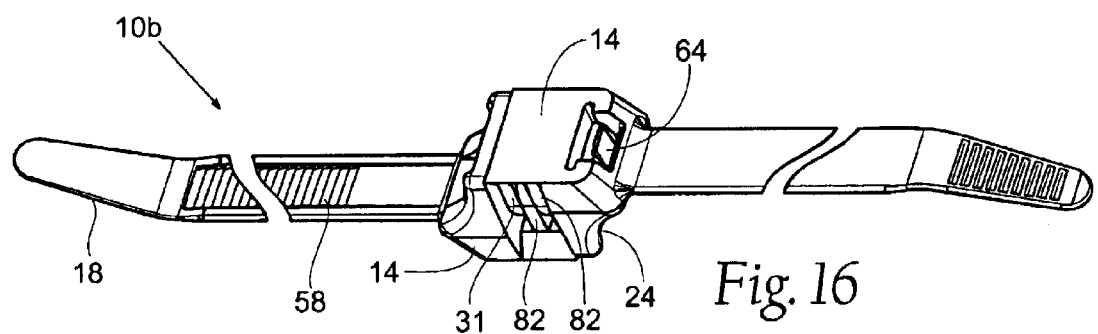
FIG. 16 is a perspective view of the rotatable dual spacing tie clamp showing the bifurcated locking head members in relative alignment.
Figure 17:
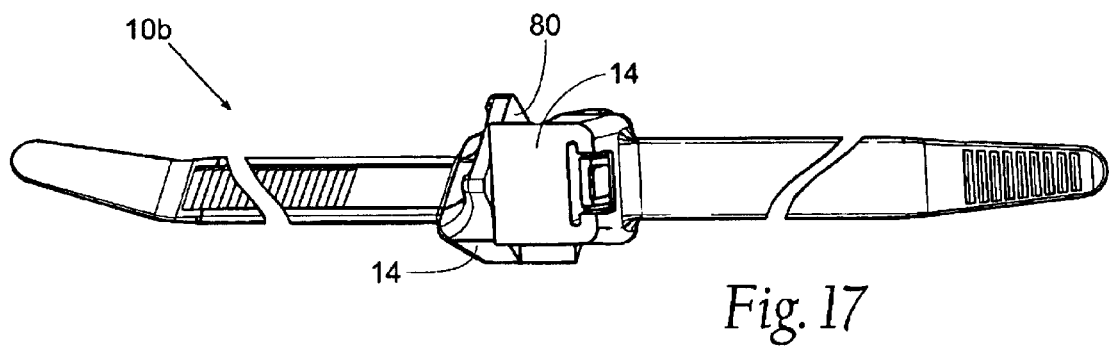
FIG. 17 is a perspective view of the rotatable dual spacing tie clamp showing rotational movement and with the bifurcated locking head members positioned in angularly relative alignment with respect to one another.
Figure 18:
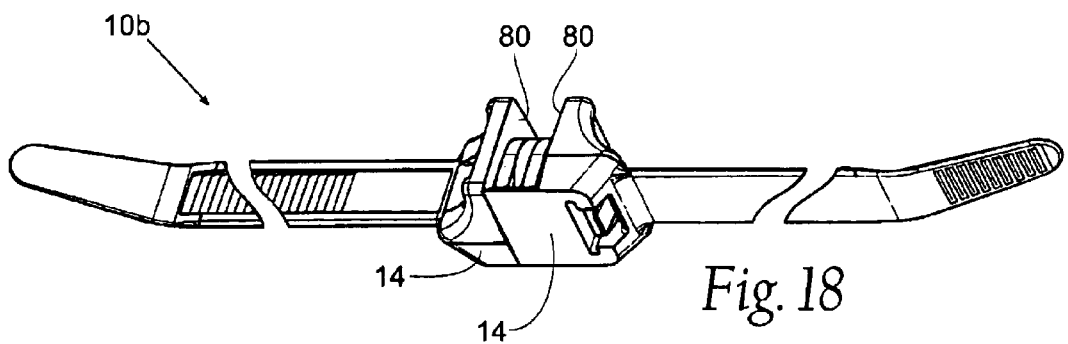
FIG. 18 is a perspective view of the rotatable dual spacing tie clamp showing rotational movement and with the bifurcated locking head members positioned in angularly relative alignment with respect to one another.
Figure 19:
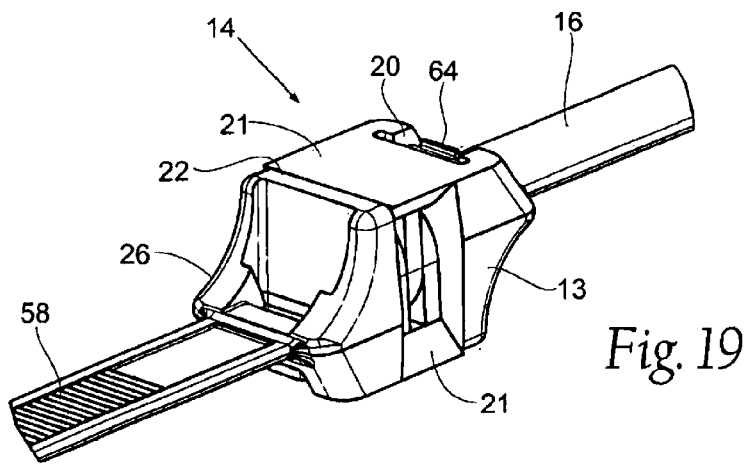
FIG. 19 is a fragmentary perspective view of the rotatable dual spacing tie clamp showing the bifurcated locking head members in relative alignment.
Figure 20:
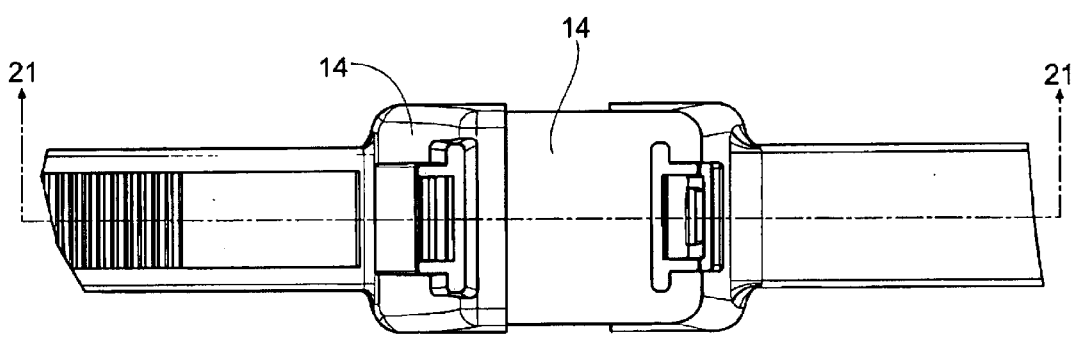
FIG. 20 is a fragmentary top plan view of the rotatable dual spacing tie clamp again showing the bifurcated locking head members in relative alignment.
Figure 21:
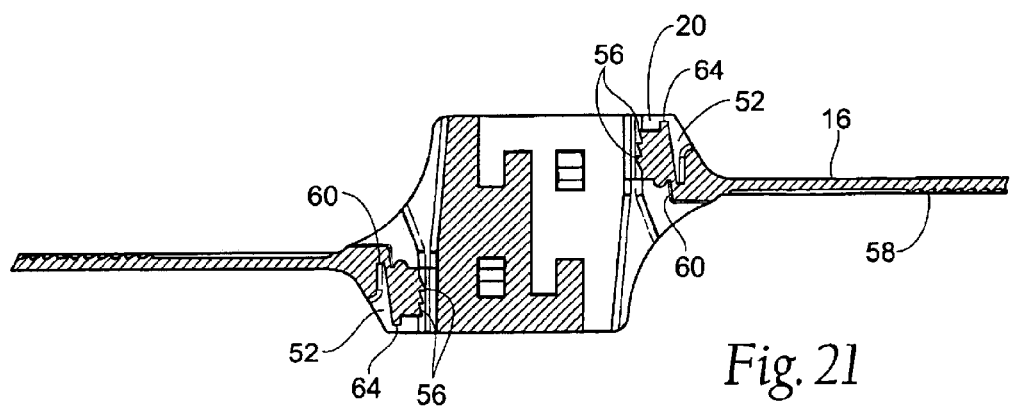
FIG. 21 is a longitudinal section view of the rotatable dual spacing tie clamp taken along lines 21—21 of FIG. 20.
Figure 22:
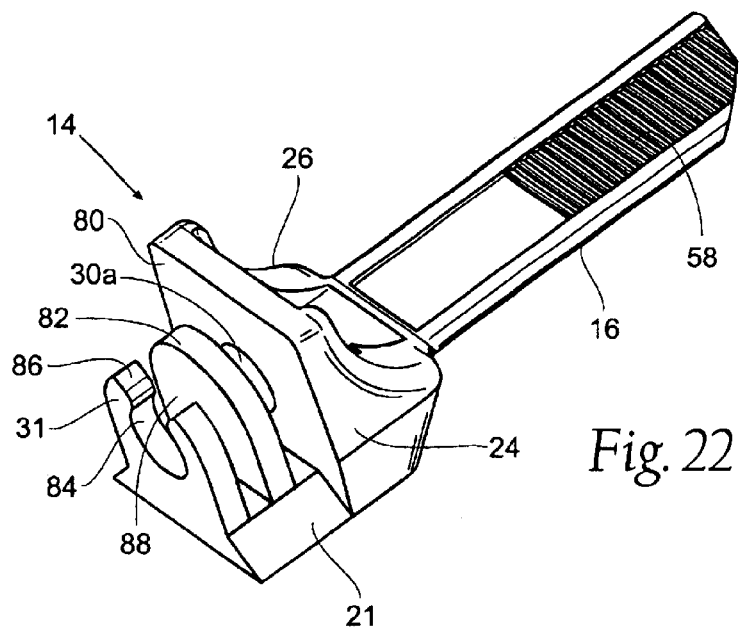
FIG. 22 is a fragmentary perspective view of one bifurcated head member of the rotatable dual spacing tie clamp.
Figure 23:
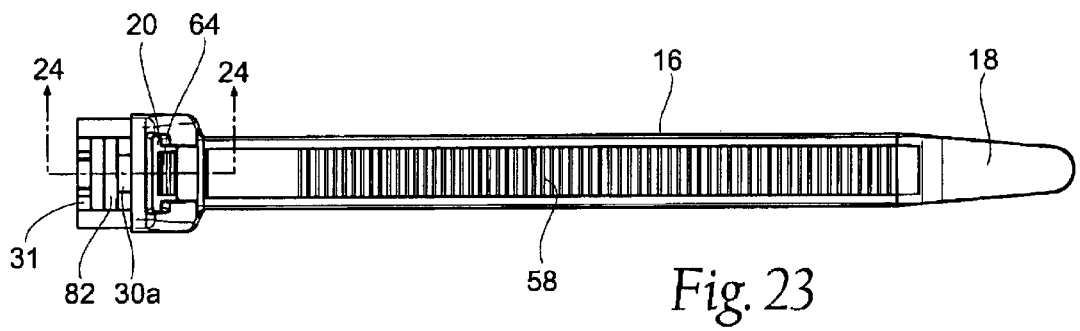
FIG. 23 is a top plan view of one bifurcated head member and strap.
Figure 24:
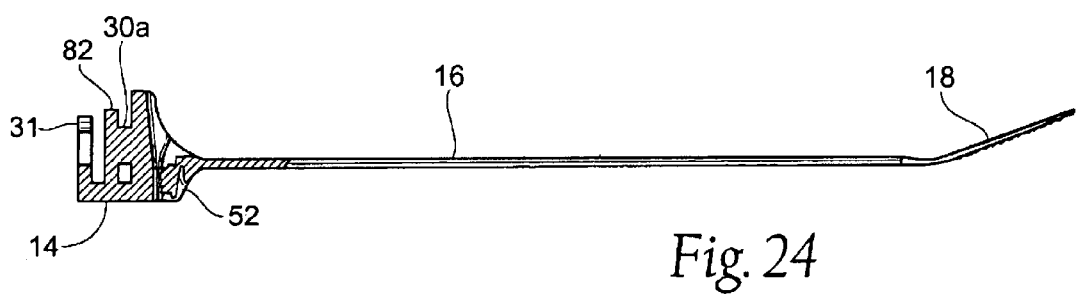
FIG. 24 is partial longitudinal section view of one bifurcated head member of the rotatable dual spacing tie clamp taken along lines 24—24 of FIG. 23.
Figure 25:
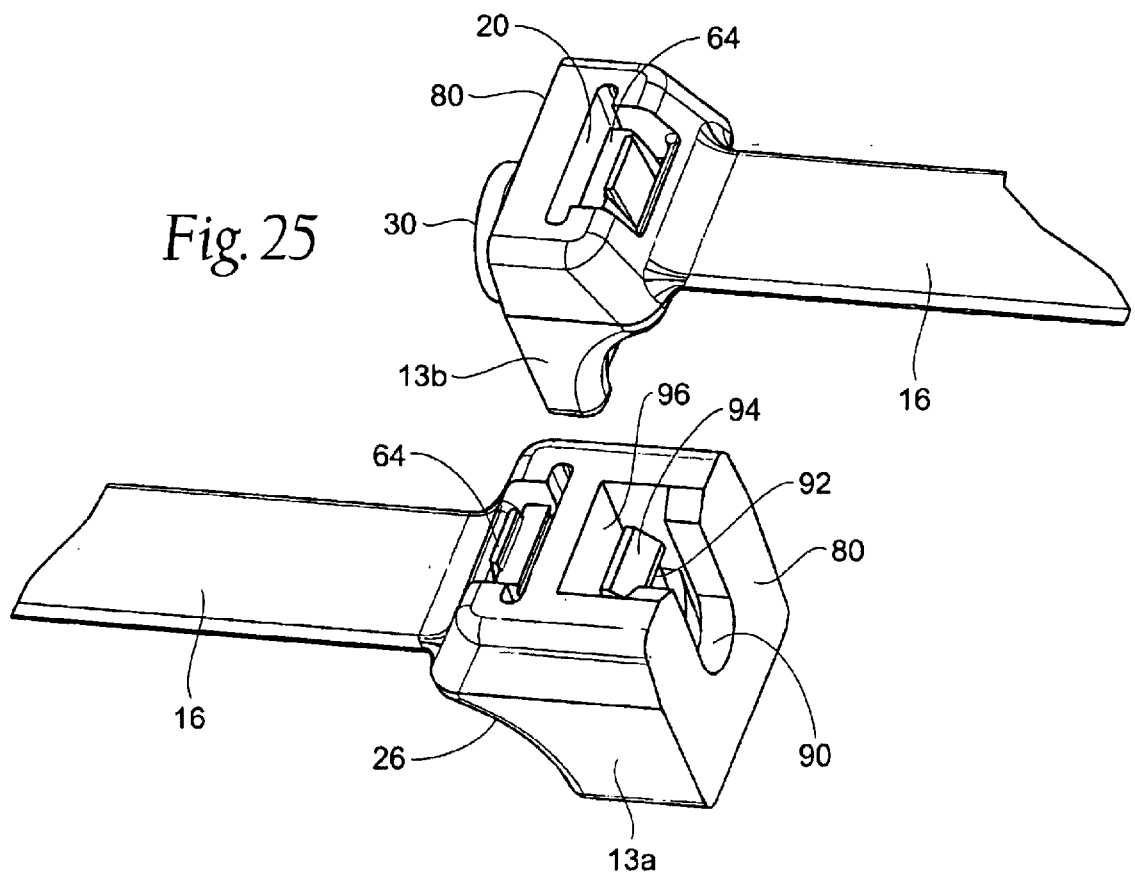
FIG. 25 is a perspective exploded view of a rotatable dual spacing tie clamp embodying the various features of the invention.
Figure 26:
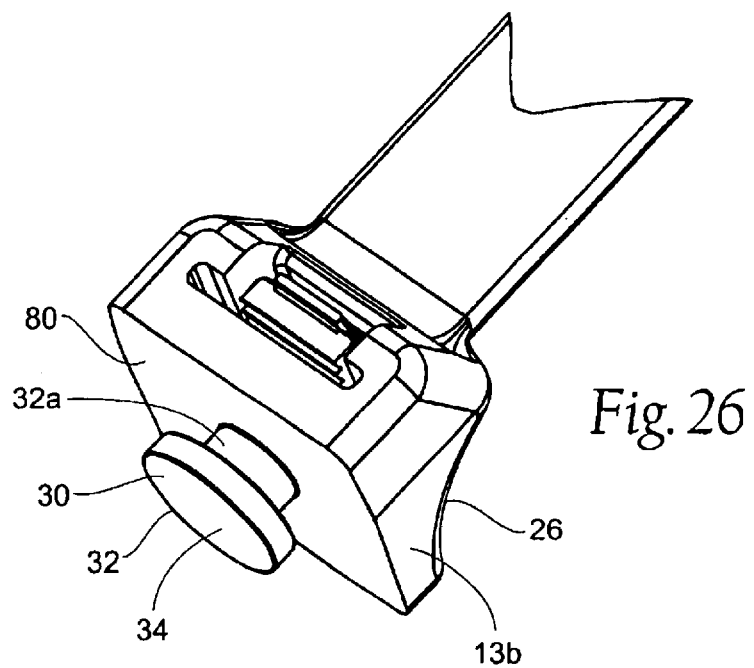
FIG. 26 is a fragmentary perspective view of the first bifurcated head member and strap.

As best shown in FIG. 15, two identical head members 14 are snap fit together to form the dual spacing tie clamp 10b. The assembled clamp is shown in FIGS. 19 and 20. FIG. 21 shows the relative alignment and cooperation between head members 14 when assembled. FIGS. 16–18 depict the relative rotational movement of the head members 14 relative to one another.

Now referring to FIGS. 25–36, yet another embodiment of the rotatable dual spacing clamp tie 10c includes a first head member 13b including a centrally located pivot pin 30 having a distal end portion 34 including a primary, radially extending, head portion 32 and undercut collar 32a. As in the first embodiment described above, the pivot pin 30 is integrally formed with flange portion 80 of head member 13b as shown in FIGS. 26, 32, 35 and 36. Second head member 13a includes an integrally formed receiving channel 90 sized to receive the undercut collar 32a of pivot pin 30. As best seen in FIGS. 25 and 32–34, a cantilevered retaining snap 92, including a head 94 is centrally positioned adjacent the receiving channel 90 and within an opening 96 formed in head member 13a. During assembly of the mating halves 13a and 13b, the pin 30 is received within the receiving channel 90 and the pivot pin head 32 biases the retaining snap head 94 as the mating halves 13a and 13b are brought together. Once the pin head 32 passes the snap head 94, the snap 92 returns to its initial position (see FIG. 32) thereby retaining the head members 13a and 13b together. The undercut collar 32a is cradled within the receiving channel 90. Flange portions 80 on each head member 13a and 13b provide additional surface engagement and support at any desired rotational alignment of the head members 13a and 13b.

Figure 27:
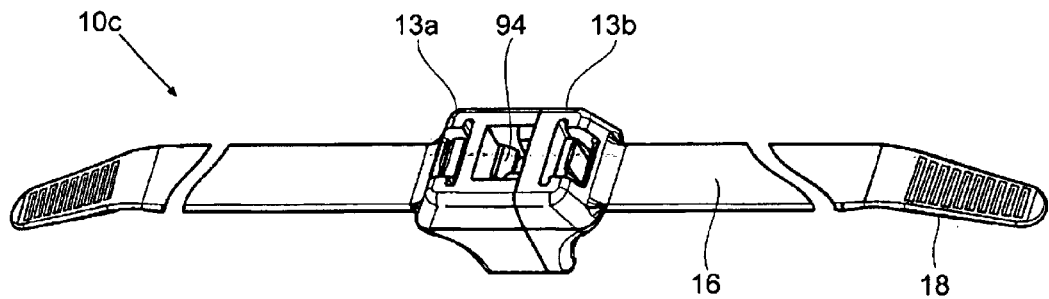
FIG. 27 is a perspective view of the rotatable dual spacing tie clamp showing the bifurcated locking head members in relative alignment.
Figure 28:
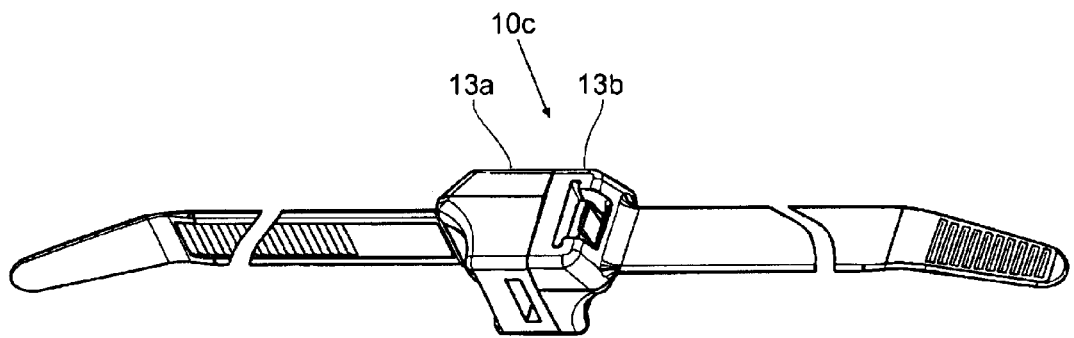
FIG. 28 is a perspective view of the rotatable dual spacing tie clamp showing rotational movement and with the bifurcated locking head members positioned in angularly relative alignment with respect to one another.
Figure 29:
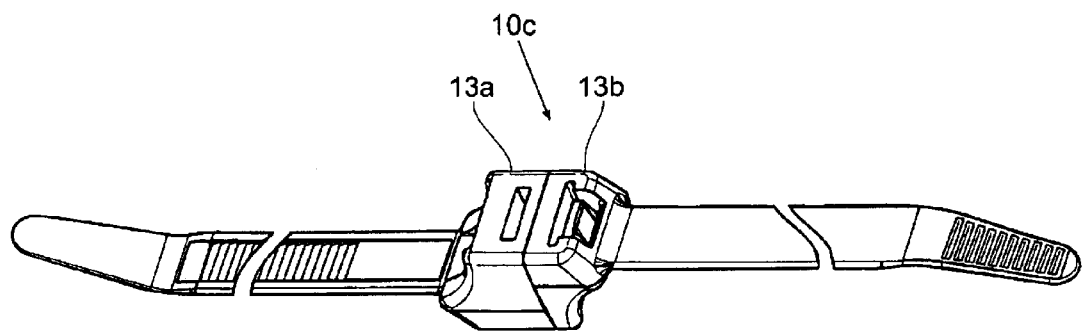
FIG. 29 is a perspective view of the rotatable dual spacing tie clamp showing rotational movement and with the bifurcated locking head members positioned again in angularly relative alignment with respect to one another.
Figure 30:
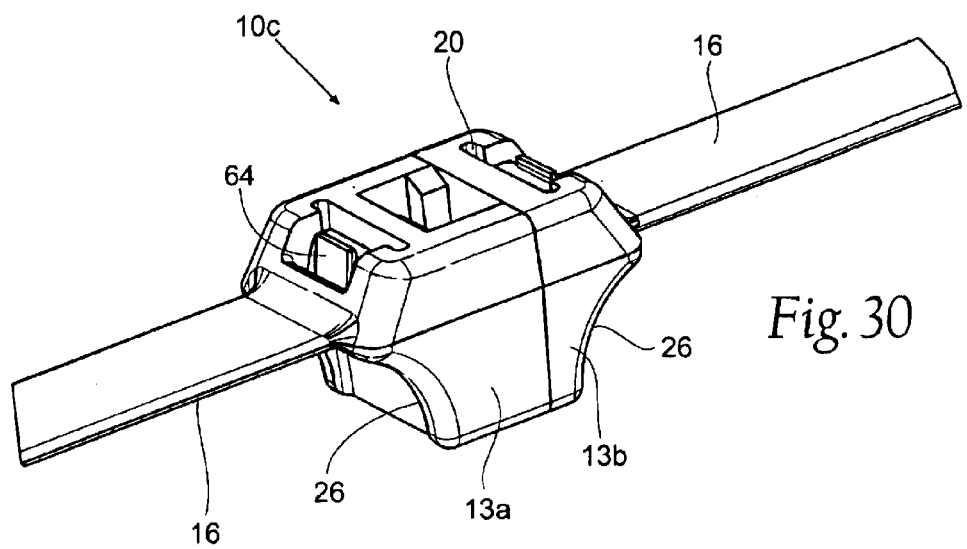
FIG. 30 is a fragmentary perspective view of the rotatable dual spacing tie clamp showing the bifurcated locking head members in relative alignment.
Figure 31:
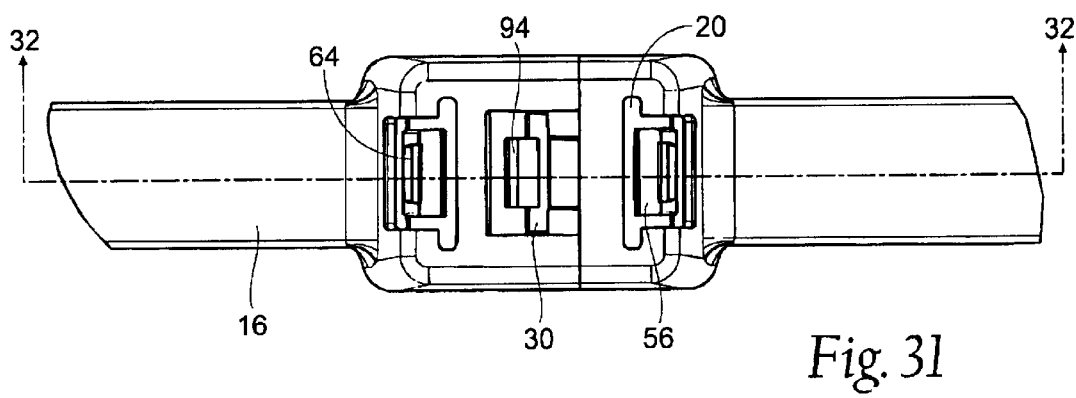
FIG. 31 is a top plan view of the rotatable dual spacing tie clamp showing the bifurcated locking head members in relative alignment.
Figure 32:
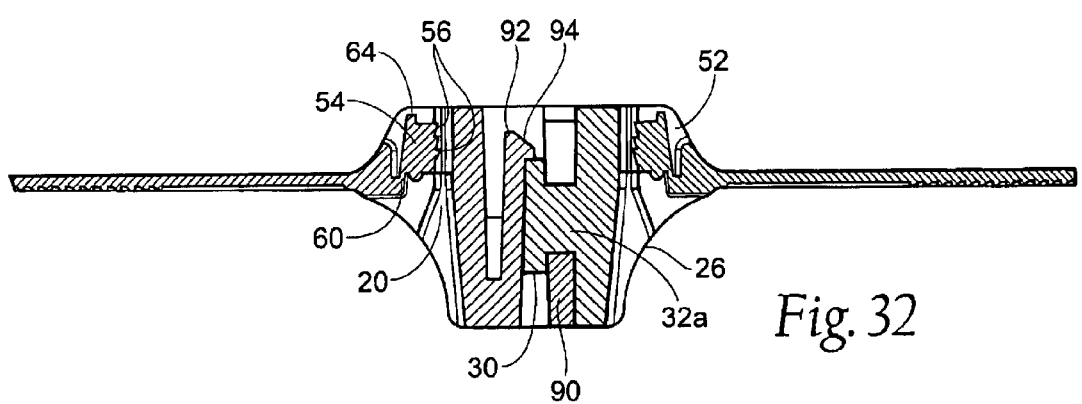
FIG. 32 is a longitudinal section view of the rotatable dual spacing tie clamp taken along lines 32—32 of FIG. 31.
Figure 33:
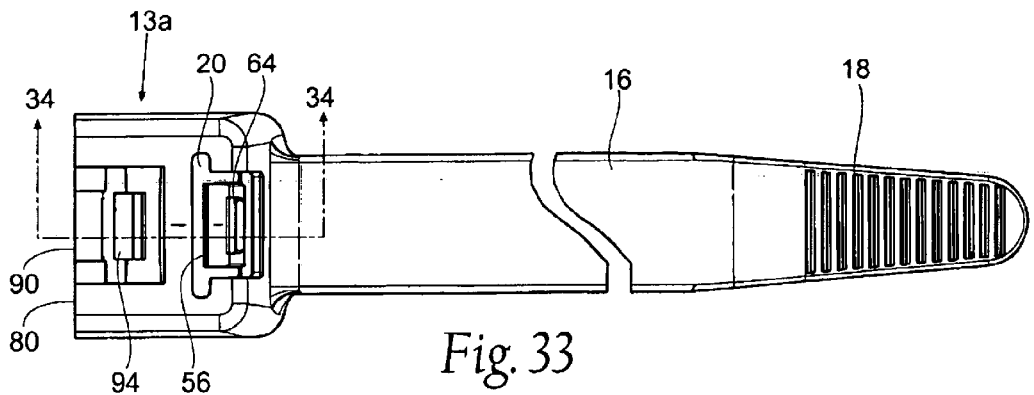
FIG. 33 is a top plan view of the second bifurcated head member and strap.
Figure 34:
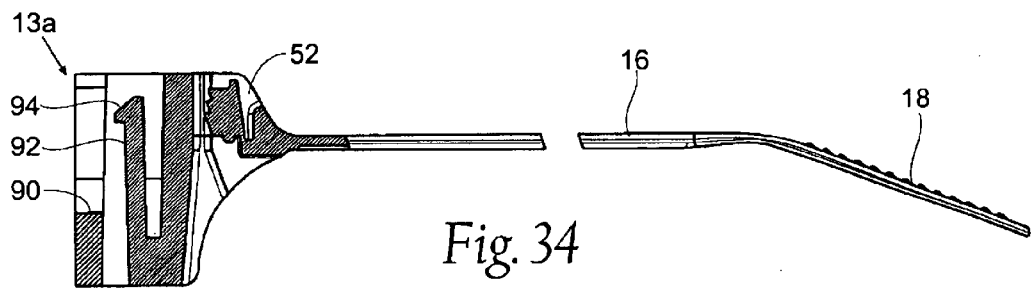
FIG. 34 is a partial longitudinal section view of the second bifurcated head member of the rotatable dual spacing tie clamp taken along lines 34—34 of FIG. 33.
Figure 35:
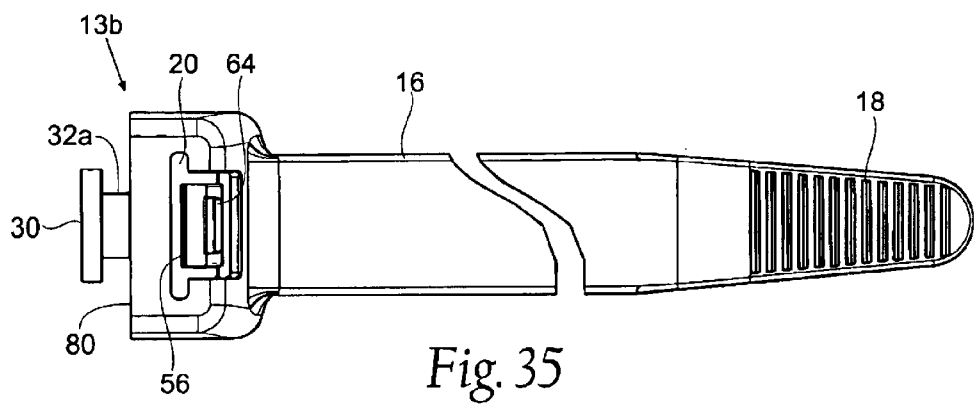
FIG. 35 is a top plan view of the first bifurcated head member and strap.
Figure 36:
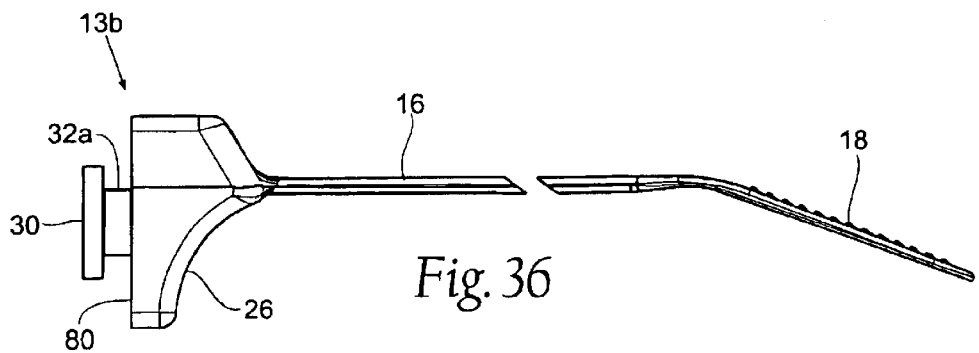
FIG. 36 is a front plan view of the first bifurcated head member and strap.

FIGS. 27–29 show the relative rotational movement between the head members 13a, 13b. In this embodiment, the head members can be rotated three hundred and sixty degrees. Thus any desired angle between the bundles 11 and 12 can be achieved.

While the pin 30 and receiving channel 90 are shown to be centrally located, it is to be understood that each could be located anywhere along flanges 80.

Preferably, the components for the clamp tie are injection molded from a strong, durable plastic, such as Nylon 6/6 HIR.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. A rotatable dual spacing clamp tie comprising:
a bifurcated head including a pair of locking head members, each of said members including a laterally spaced aperture;
means for pivotally and rotatably supporting said pair of head members relative to one another;
a pair of straps each one of said pair extending in opposite directions from a respective one of said pair of head members;
a first pawl mechanism contained within one of said apertures for engaging and retaining one of said straps;
a second pawl mechanism contained within the other of said locking head apertures for engaging and retaining the other of said straps; and
a mounting means for anchoring said dual spacing clamp to a supporting structure.

2. The rotatable dual spacing clamp tie of claim 1, wherein said mounting means comprises at least one apertured mounting boss integrally formed with one of said bifurcated head members, and arranged to receive a mounting element therethrough.

3. The rotatable dual spacing clamp tie of claim 2 wherein said mounting boss includes at least one pawl mechanism operable to permit movement of a mounting element in a first direction through said aperture and to resist movement of the mounting element in the opposite direction through the aperture.

4. The rotatable dual spacing clamp tie of claim 3 wherein said pawl mechanism allows for insertion from one end only.

5. The rotatable dual spacing clamp tie of claim 4 wherein said at least one pawl mechanism includes at least one triangularly shaped pawl carried at the end of an elongate hinge and disposed within the aperture.

6. The rotatable dual spacing clamp tie of claim 3 wherein said mounting boss includes a central axis and wherein said pawl mechanism is orientated obliquely relative to the central axis of said mounting boss.

7. The rotatable dual spacing clamp tie of claim 6 wherein said pawl mechanism includes a distal end point located within the aperture and wherein said pawl mechanism includes an innermost portion proximate to the wall surface defining said aperture.

8. The rotatable dual spacing clamp tie of claim 6 wherein said pawl mechanism includes a plurality of barbs located within the aperture.

9. The rotatable dual spacing clamp tie of claim 1 wherein said head members are supported by and rotatable relative to an independently formed disc member.

10. The rotatable dual spacing clamp tie of claim 9 wherein said disc member includes a centrally located pivot pin and a primary, radially extending, flange portion, and wherein said locking head members each include means for pivotally receiving and attaching said head members to said pivot pin of said disc member.

11. The rotatable dual spacing clamp tie of claim 10 wherein said means for pivotally receiving and attaching said head members to said pivot pin includes a secondary flange portion radially extending from a distal end of said pivot pin and wherein said locking head members each include a centrally located re-entrant bore having an interior configuration adapted to receive and rotatably engage said secondary flange portion.

12. The rotatable dual spacing clamp tie of claim 1, wherein one of said bifurcated head members contains an integrally formed pivot member extending laterally therefrom and including a radially extending integral flange proximate to its distal end, and wherein the other of said bifurcated locking members includes a re-entrant bore for substantially conforming to the configuration of said integrally formed pivot member.

13. The rotatable dual spacing clamp tie of claim 1, wherein one of said bifurcated head members contains an integrally formed pivot member extending laterally therefrom and including a radially extending integral flange proximate to its distal end, and wherein the other of said bifurcated locking members includes a U-shaped channel for receiving said integrally formed pivot member.

14. The rotatable dual spacing clamp tie of claim 13, wherein the other of said bifurcated locking members further includes a retaining means for retaining said pivot member.

15. The rotatable dual spacing tie clamp of claim 14, wherein said retaining means comprises a cantilevered snap having a head portion, said head portion engaging said pivot member flange.

16. The rotatable dual spacing clamp tie of claim 1, wherein the first of said bifurcated head members includes an integrally formed pivot pin member extending laterally therefrom and a retaining means proximate to the first head member distal end, and wherein the second of said bifurcated head members includes an integrally formed pivot pin member extending laterally therefrom and a retaining means proximate to the second head member distal end.

17. The rotatable dual spacing clamp tie of claim 16, wherein at least one of said retaining means comprises a C-shaped clamp.

18. The rotatable dual spacing tie clamp of claim 17, wherein at least one of said pivot pin members is supported on each of its ends.

19. A rotatable dual spacing clamp tie comprising:

a bifurcated head including first and second locking head members, each of said members including a laterally spaced aperture;

each of said locking head members including a clip mechanism and a pivot pin, whereby the clip mechanism of the first locking head member is adapted to receive the pivot pin of the second locking head member and the clip mechanism of the second locking head member is adapted to received the pivot pin of the first locking head member;

a pair of straps each one of said pair extending in opposite directions from a respective one of said pair of head members;

a first pawl mechanism contained within one of said apertures for engaging and retaining one of said straps; and a second pawl mechanism contained within the other of said locking head apertures for engaging and retaining the other of said straps.

20. A rotatable dual spacing clamp tie comprising:

a bifurcated head including first and second locking head members, each of said members including a laterally spaced aperture;

said first locking head member including a flange portion and a radially extending pivot pin;

said second locking head member including a flange portion and channel adapted to receive and retain said pivot pin when said flange portions are substantially adjacent;

a pair of straps each one of said pair extending in opposite directions from a respective one of said pair of head members;

a first pawl mechanism contained within one of said apertures for engaging and retaining one of said straps; and a second pawl mechanism contained within the other of said locking head apertures for engaging and retaining the other of said straps.

\* \* \* \* \*